(No Model.) 2 Sheets—Sheet 1.

E. B. DEAL.
CULINARY UTENSIL.

No. 575,418. Patented Jan. 19, 1897.

Witnesses:
F. L. Ourand
A. P. Smith

Inventor:
Edward B. Deal
By H. B. Willson
Attorney.

(No Model.) 2 Sheets—Sheet 2.
E. B. DEAL.
CULINARY UTENSIL.
No. 575,418. Patented Jan. 19, 1897.
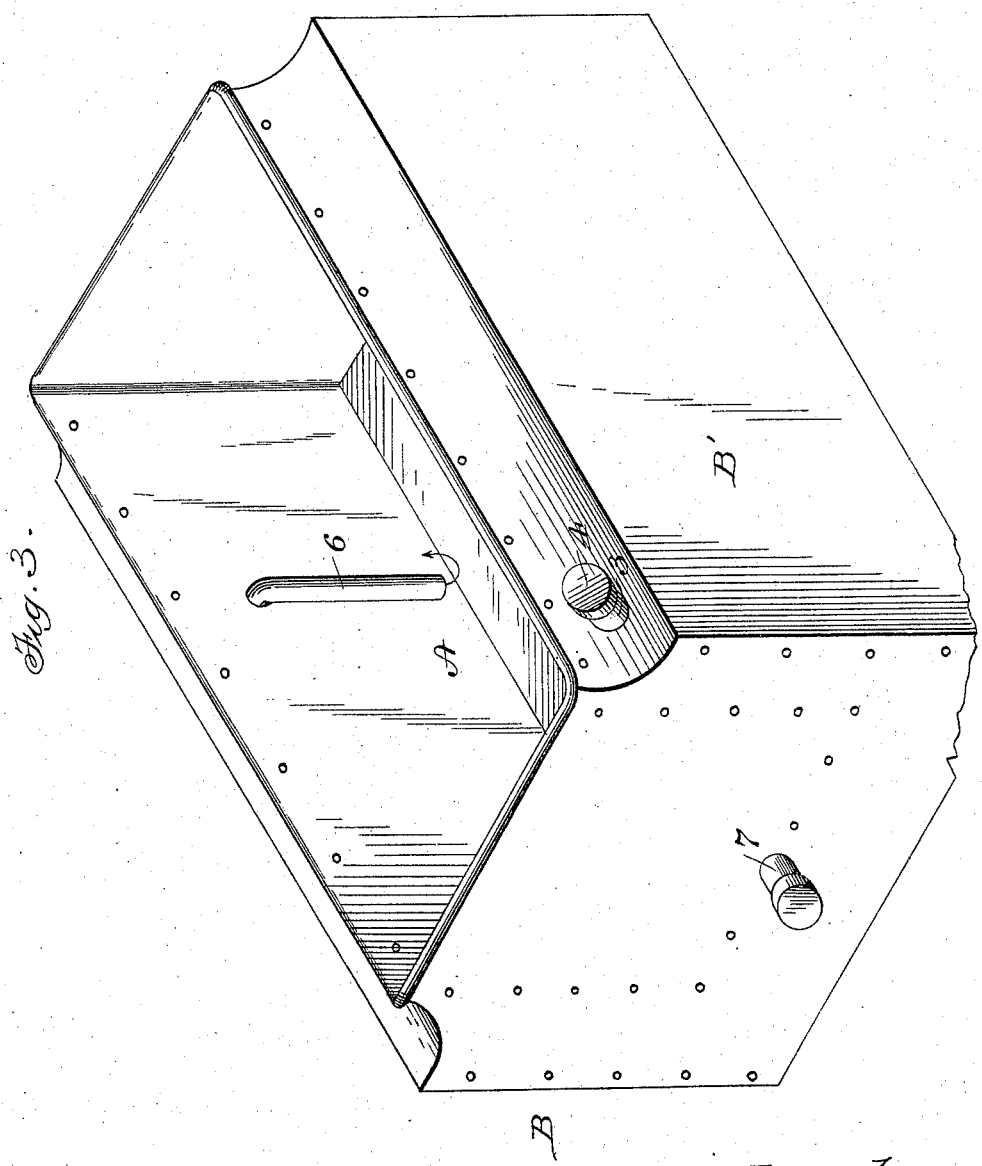
Witnesses:
F. L. Oyraud
A. S. Smith
Inventor:
Edward B. Deal.
By H. B. Wilson
Attorney

UNITED STATES PATENT OFFICE.

EDWARD B. DEAL, OF ROME, IOWA, ASSIGNOR OF ONE-HALF TO DAVID C. DEAL, OF BELLEVILLE, KANSAS.

CULINARY UTENSIL.

SPECIFICATION forming part of Letters Patent No. 575,418, dated January 19, 1897.

Application filed February 13, 1896. Serial No. 579,119. (No model.)

*To all whom it may concern:*

Be it known that I, EDWARD B. DEAL, a citizen of the United States, residing at Rome, in the county of Henry and State of Iowa, have invented certain new and useful Improvements in Culinary Utensils; and I do declare the following to be a full, clear, and exact description of the invention, such as will enable others skilled in the art to which it appertains to make and use the same.

My invention has relation to improvements in culinary utensils, and especially to that class or kind of such utensils intended for use for cooking by the application of steam; and the object is to make and provide an improved utensil consisting of a pan or dish of simplified construction and which will fill the purposes with certainty, expeditiously, and completely.

I have fully and clearly illustrated my improvements in the accompanying drawings, wherein—

Figure 1:
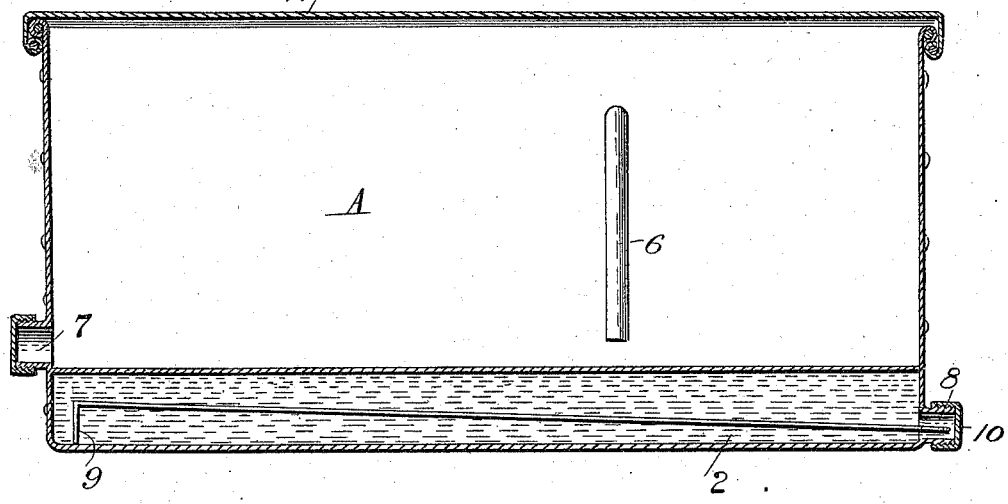
Figure 2:
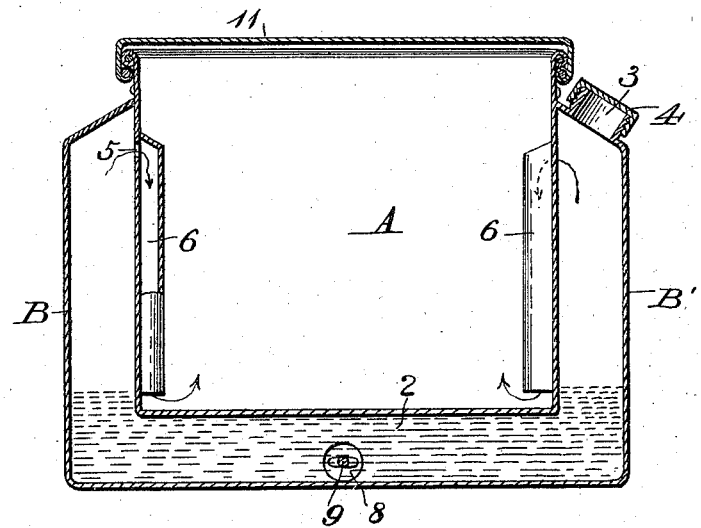

Figure 1 is a longitudinal central section of the utensil. Fig. 2 is a transverse vertical section through the utensil. Fig. 3 is a perspective of the complete utensil.

A designates a rectangular vessel, of suitable sheet metal, made water-tight and of such capacity as may be suitable to the uses to which it is to be put.

B B' designate the outer walls of the steam-chests, located at a suitable distance from the sides of the vessel and sealed thereto by any proper cementation. The walls B B' extend the whole length of the sides of the vessel, and the bottom 1 is made integral therewith, the water-space 2 extending entirely over the area of the bottom of the inner vessel and entirely the length of the sides and reaching nearly to the top thereof. The end pieces of the vessel are extended laterally beyond the sides thereof, forming end closures to the water-jacket, as shown in the drawings, and the sides of the water-jacket are secured thereto, the opening at the top between the inner vessel and the water-jacket being closed by having the metal of the jacket bent over the opening and the edges hermetically secured to the edge or wall of the inner vessel. The water-jacket thus envelops the walls of the inner vessel except at the ends. In the top of one of the water-jacket walls is fitted and secured a water-filling spout 3, having screw-threads on which is arranged a screw-cap 4, the water being supplied through the tube to the space between the inner vessel and the water-jacket. In the sides of the inner vessel are made one or more apertures 5, opening into a steam-pipe 6, having a closed upper end and extending down into the vessel to near the bottom thereof and opening therein, so that the steam escaping through the pipes will be delivered into the vessel adjacent to the bottom and in direct contact with the lower portion of the contents and rise up through them or be distributed upward, according to well-known laws. In the end of the vessel is a drawing-off tube 7, which is properly closed by detachable means.

In order that any accumulations or deposits accruing in the water-jacket may be removed, a tube 8 may be let into the end of the water-jacket, in which the bar of a scraper 9 may be arranged and the tube closed and the end of the scraper-bar concealed and covered by a screw-cap 10, substantially as shown.

The utensil is provided with a suitable close-fitting cover 11, which is detachably secured in place by any proper means.

The operation and use may be stated as follows: The water jacket or space is supplied with a sufficient quantity of water to fill the space between the two bottoms and extend up the spaces between the walls. The vessel is then placed on the heating agent with the articles to be cooked therein, and then when the water is heated to throw off steam the steam rises and escapes down through the steam-pipes, and is thus continuously supplied until the cooking is completed.

Having thus described my invention, what I claim, and desire to secure by Letters Patent, is—

A steam cooking utensil, comprising an inner open-top rectangular vessel, having the end pieces extended laterally in both directions to form closures for the ends of the water-jacket, steam conduit-pipes arranged in the inner vessel with their upper ends leading from the steam-space and extending to and opening adjacent to the bottom of the inner vessel, an outer vessel extending under the bottom and along the sides only of the inner vessel forming a water-space between the vessels, and having its ends secured to the lateral extension of the end pieces of the inner vessel and its top edges bent over and hermetically secured to the top edges of the inner vessel, a drawing-off tube to take the water from the inner vessel, a filling-tube to supply water to the water-space and a cover for the inner vessel.

In testimony whereof I hereunto affix my signature in presence of two witnesses.

EDWARD B. DEAL.

Witnesses:
J. W. BEABER,
BLANCHE BEABER.